United States Patent [19]

Crockett

[11] Patent Number: 5,419,626

[45] Date of Patent: May 30, 1995

[54] COMPUTER HOUSING SEAL

[75] Inventor: Robert J. Crockett, Central, S.C.

[73] Assignee: NCR Corporation, Dayton, Ohio

[21] Appl. No.: 115,376

[22] Filed: Sep. 1, 1993

[51] Int. Cl.⁶ .......................................... A47B 81/00
[52] U.S. Cl. .................... 312/7.2; 312/223.2
[58] Field of Search ............................ 312/7.2, 223.2;
348/835, 840, 841, 842; 174/52.3; 361/681, 682;
52/397, 393, 202, 203, 396.4, 656.5, 776;
40/152, 159.2

[56] References Cited

U.S. PATENT DOCUMENTS

| | | | |
|---|---|---|---|
| 2,737,649 | 3/1956 | Pifer | 348/841 |
| 3,242,604 | 3/1966 | Ott | 40/152 |
| 4,017,129 | 4/1977 | Boldt et al. | 312/7.2 |
| 4,089,464 | 5/1978 | Teti et al. | 312/264 |
| 4,425,014 | 1/1984 | Blepp | 312/284 |
| 4,581,865 | 4/1986 | Miller | 52/202 |
| 4,587,567 | 5/1986 | Yamamori et al. | 312/7.2 |
| 4,592,180 | 6/1986 | Gerritsen | 52/203 |
| 4,593,227 | 6/1986 | Bruce et al. | 312/7.2 |
| 4,730,364 | 3/1988 | Tat-Kee | 16/337 |
| 4,958,889 | 9/1990 | Boyle et al. | 312/208 |
| 4,979,636 | 12/1990 | Daly | 220/324 |
| 5,021,763 | 6/1991 | Obear | 340/407 |
| 5,033,802 | 7/1991 | Fairbanks | 312/7.2 |
| 5,090,913 | 2/1992 | Kobayashi | 361/681 |
| 5,125,175 | 6/1992 | Huff | 40/152 |
| 5,164,542 | 11/1992 | Hart | 174/35 MS |

Primary Examiner—Kenneth J. Dorner
Assistant Examiner—Janet M. Wilkens
Attorney, Agent, or Firm—Paul J. Maginot

[57] ABSTRACT

A portable computer housing for containing a display device having a display frame includes a housing structure for containing the display device and defining a display aperture, wherein a portion of the display frame is exposed through the display aperture when the display device is contained within the housing structure. The portable computer housing further includes an elastomeric overmold which covers a portion of the housing structure which surrounds the display aperture and extends over the display aperture so to form an elastomeric flange, wherein the elastomeric flange is positioned in contact with the portion of the display frame which is exposed through the display aperture. Moreover, the elastomeric flange includes a upper lock member, and the display frame includes a lower lock member, wherein the upper lock member cooperates with the lower lock member so as to lock the elastomeric overmold to the display frame and seal the computer housing.

11 Claims, 3 Drawing Sheets

COMPUTER HOUSING SEAL

Cross reference is made to U.S. Pat. No. 5,363,276 entitled "Apparatus for Containing and Supporting Electronic Devices" issued to Robert J. Crockett; U.S. Ser. No. 08/115,299 (NCR Docket No. 5772), entitled "Computer Display Assembly" by Robert J. Crockett; U.S. Ser. No. 08/115,295 (NCR Docket No. 5819), entitled "Isotropic Shock Mounting" by Randal A. Burke; and U.S. Ser. No. 29/012,456 (NCR Docket No. D-5671), entitled "Portable Computer" by Donald Carr, Scott Belliveau and Robert Paterson, all assigned to the same assignee as the present invention, and all filed concurrently herewith.

BACKGROUND OF THE INVENTION

The present invention relates generally to computers, and more particularly to a seal for a computer housing.

Portable computers are becoming increasingly popular. A portable computer is typically transported from a storage site to a remote operating site and then back to the storage site. As a result, the portable computer is exposed many environmental contaminants such as water, dust and dirt. Operation of the portable computer may be negatively affected if these contaminants enter the interior of the computer housing. One location where these contaminants may enter the interior of the computer housing is the location where the display device of the computer contacts the portion of the computer housing which surrounds a display aperture defined in the computer housing through which the display device may be viewed by a user.

It would be desirable to provide a portable computer that effectively locks out environmental contaminants such as water, dust and dirt from the interior of its housing. It would also be desirable if such portable computer was rugged. It would further be desirable if such portable computer was easy to assemble and inexpensive to manufacture.

SUMMARY OF THE INVENTION

In accordance with one embodiment of the present invention, there is provided an apparatus for housing an electronic device having a display. The apparatus includes a housing structure having a display aperture defined therein, wherein the display is exposed through the display aperture when the electronic device is housed in the apparatus. The apparatus further includes an elastomeric overmold which covers a portion of the housing structure which surrounds the display aperture and extends over a portion of the display aperture so to form a flange which contacts the display.

Pursuant to another embodiment of the present invention, there is provided a portable computer housing for containing a display device having a display frame. The portable computer housing includes a housing structure for containing the display device and defining a display aperture, wherein a portion of the display frame is exposed through the display aperture when the display device is contained within the housing structure. The portable computer housing further includes an elastomeric overmold which covers a portion of the housing structure which surrounds the display aperture and extends over a portion of the display aperture so to form an elastomeric flange, wherein the elastomeric flange is positioned in contact with the portion of the display frame which is exposed through the display aperture so as to form a seal between the elastomeric overmold and the display frame.

In accordance with yet another embodiment of the present invention, there is provided an apparatus for housing an electronic device which includes a display having a first lock member. The apparatus includes a housing structure having a display aperture defined therein, wherein the display is exposed through the display aperture when the electronic device is housed in the apparatus. The apparatus further includes an elastomeric overmold being secured to the housing structure and having a second lock member, wherein the first lock member cooperates with the second lock member so as to seal the housing.

It is therefore an object of the present invention to provide a new and useful computer.

It is a further object of the present invention to provide an improved computer.

It is another object of the present invention to provide a portable computer that effectively locks out environmental contaminants such as water, dust and dirt from the interior of its housing.

It is moreover an object of the present invention to provide an environmentally protected portable computer that is rugged.

It is still another object of the present invention to provide an environmentally protected portable computer which is easy to assemble and inexpensive to manufacture.

The above and other objects, features, and advantages of the present invention will become apparent from the following description and the attached drawings.

DETAILED DESCRIPTION OF THE PREFERRED EMBODIMENT

Figure 1:
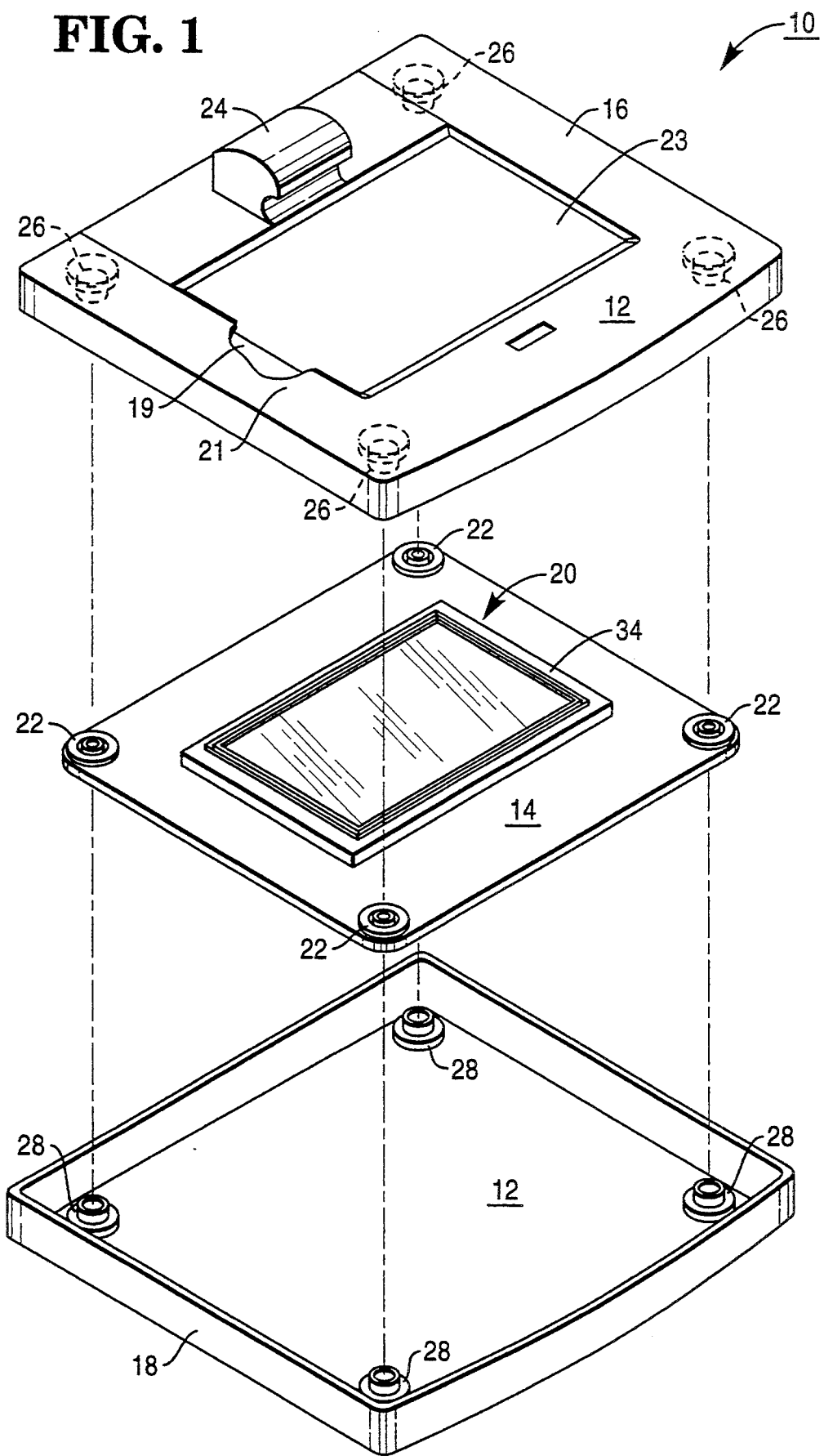
FIG. 1 is an exploded perspective view of the portable computer that incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
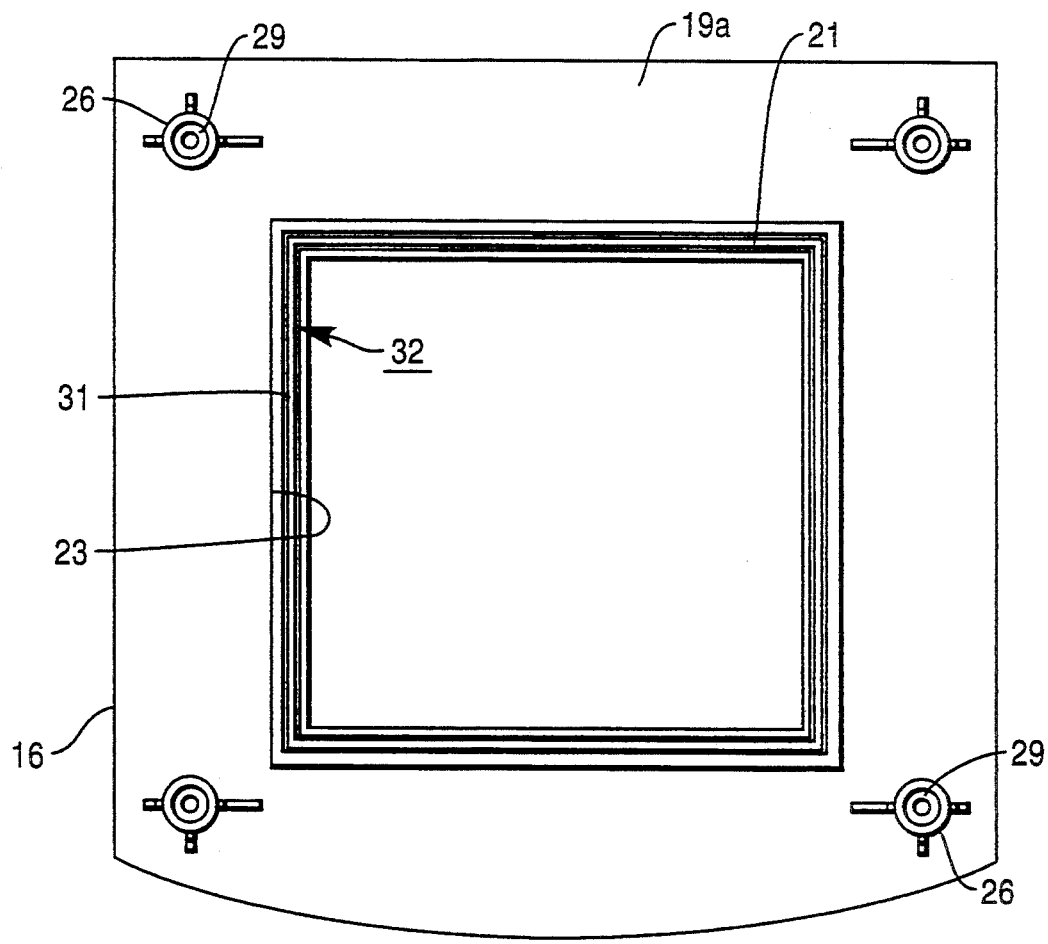
FIG. 2 is a planar view of the interior side of the upper housing portion of the portable computer of FIG. 1.
Figure 3:
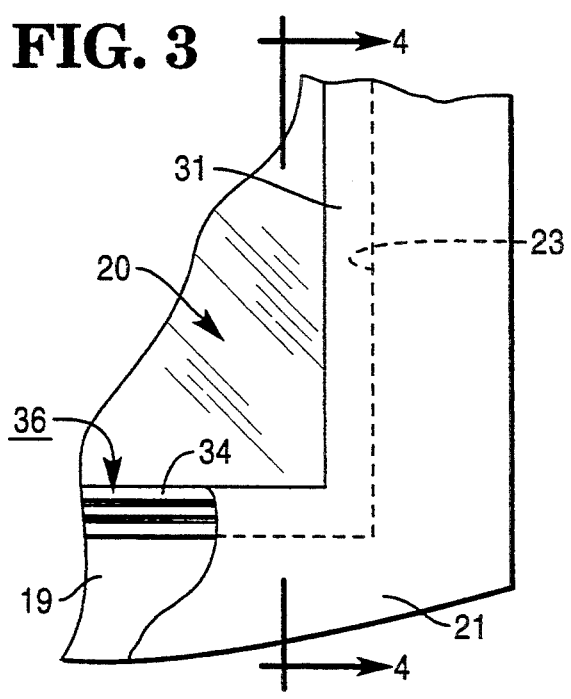
FIG. 3 a fragmentary planar view of the portable computer of FIG. 1, with a portion of the elastomeric overmold shown removed for clarity of description.
Figure 4:
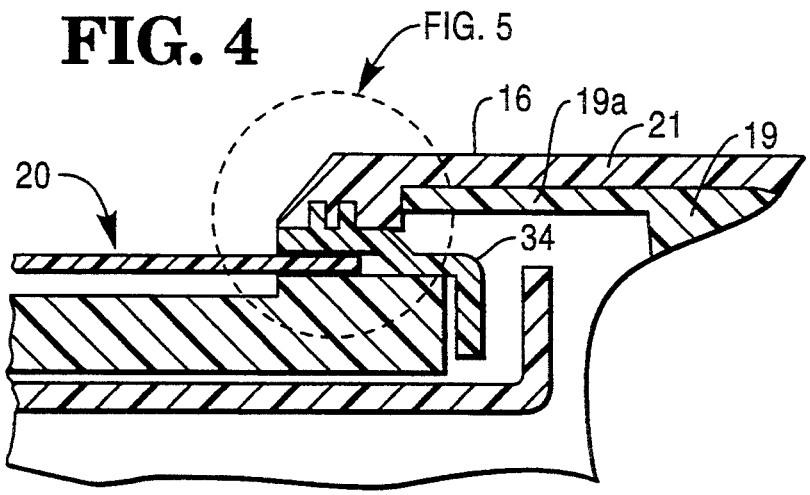
FIG. 4 is a fragmentary sectional elevational view taken in the direction of the arrows 4—4 of FIG. 3.
Figure 5:
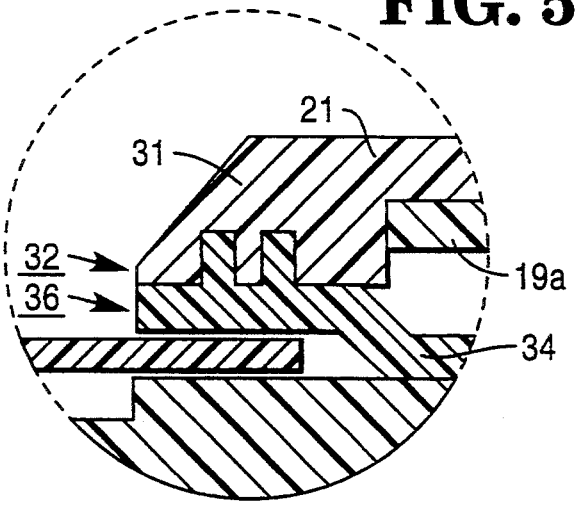
FIG. 5 is an enlarged view of a portion of FIG. 4 which is encircled and indicated as FIG. 5.
Figure 6:
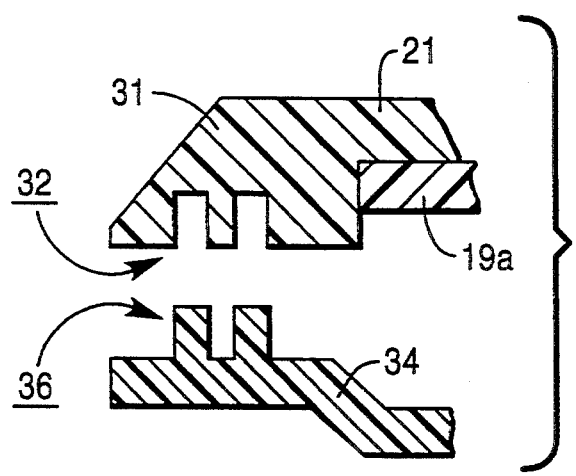
FIG. 6 is an exploded sectional elevational view of the upper lock member and the lower lock member of FIG. 5.

Referring now to FIG. 1, there is shown a portable computer, generally indicated by the reference numeral 10. The portable computer 10 includes a housing 12 and a base 14. The housing 12 includes an upper housing portion 16 and a lower housing portion 18. Each of the housing portions 16 and 18 include a housing structure 19 with an overmold material 21 positioned over the housing structure and secured thereto (see FIGS. 3-6 for further detail). The housing structure 19 includes a first housing structure member 19a (see FIG. 4). By way of example, the housing structure 19 may be made from a modified nylon material such as Noryl, a trademark of General Electric Company of Fairfield, Conn. The overmold material 21 is made of a thermoplastic elastomer such as Krayton, a trademark of Shell Oil Company of Houston, Tex. Defined within the upper housing portion 16 is a display aperture 23 as shown in FIGS. 1-3. The upper housing portion 16 includes a clip 24 for holding a stylus (not shown) used to input information on a liquid crystal display and digitizer input device, generally indicated by the reference numeral 20. The upper housing portion 16 further includes a plurality of first support members 26, and the lower housing portion 18 includes a plurality of second support members 28. Each of the first support members 26 extends away from the upper housing portion 16 and terminates at a distal end. A nut 29 is friction fit in the interior of each of the first support members 26. Each of the second support members 28 extends away from the lower housing 18 and terminates at a distal end. Moreover, each of the second support members 28 has a central passage defined therein. When the housing portions 16 and 18 are positioned relative to each other so as to contain the base 14 and the display and input device 20, the plurality of first support members 26 cooperate with the plurality of second support members 28 so as to secure a plurality of grommets or isolating members 22 within the computer housing 12 and thereby position the display and input device 20 within the computer housing 12. A screw (not shown) extends through the central passage of each of the second support members 28 and meshingly engages the nut 29 positioned within the corresponding first support member 26 so as to secure the upper housing portion to the lower housing portion. The display and input device 20 is supported on and secured to the base 14 which is a printed circuit board having electrical components (not shown) mounted thereon. The plurality of grommets 22 are secured to the base 14. Each grommet 22 is made from an elastomeric material. By way of example, one elastomeric material which may be used is a material available as model no. VL-03 (high impact absorbing material) from EAR Specialty Composite, Inc. of Indianapolis, Ind. Another elastomeric material which may be used is Scotchdamp, a trademark of 3M Corporation of St. Paul, Minn. and available as model no. SJ2015X. When housing portions 16 and 18 are positioned relative to each other so as to contain the base 14 therein, the display and input device 20 is accessible through the display aperture 23 defined in the upper housing portion 16 so that a user can view and input data through the aperture.

FIG. 2 shows a planar view of the interior side of the upper housing portion 16. The upper housing portion 16 includes the first housing structure member 19a and the overmold material 21. The entire exterior side of the first housing structure member 19a is substantially covered by the overmold material 21. In addition, the overmold material 21 extends over the display aperture 23 so as to form a flange or seal 31 as shown in FIG. 2. However, the interior side of the first housing structure member is not covered by the overmold material, as shown in FIG. 2. Defined in the flange 31 is an upper lock member, generally indicated by the reference numeral 32.

Referring now to FIGS. 3-6, the display and input device 20 includes a display frame 34 which supports various elements of the display and input device therein. Defined in the display frame 34 is a lower lock member, generally indicated by the reference number 36. The upper lock member 32 of the flange 31 cooperates with the lower lock member 36 of the display frame 34 so as to create a seal between the overmold material 21 and the display and input device 20. More specifically, the upper lock member 32 includes a first set of elongated grooves and tongues, and the lower lock member 36 includes a second set of elongated grooves and tongues which are formed complementary to the first set of elongated grooves and tongues so as to mesh in a friction fit manner thereby sealing the interior of the personal computer housing 10 from environmental contaminants such as water, dust and dirt.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. The combination of an apparatus and an electronic device having a display, the apparatus comprising:
   a housing structure having a display aperture defined therein, wherein the display is exposed through the display aperture when the electronic device is housed in the apparatus; and
   an elastomeric layer which is molded over a portion of said housing structure which surrounds the display aperture and extends over a portion of the display aperture so as to form a flange which contacts the display.

2. The apparatus of claim 1, wherein said housing structure comprises a first housing structure member which defines the display aperture therein and has an exterior side, and further wherein all of the exterior side of the first housing structure member is covered by said elastomeric layer.

3. The apparatus of claim 1, wherein:
   the flange includes a first lock member; and
   the display includes a second lock member, wherein the first lock member cooperates with the second lock member so as to create a seal between the display and the elastomeric layer.

4. The apparatus of claim 3, wherein:
   the first lock member includes a first set of elongated grooves and tongues; and
   the second lock member includes a second set of elongated grooves and tongues which are formed complementary to the first set of elongated grooves and tongues so as to mesh in a friction fit manner therewith.

5. The combination of a portable computer housing and a display device having a display frame, the portable computer housing comprising:
   a housing structure for containing the display device and defining a display aperture, wherein a portion of the display frame is exposed through the display aperture when the display device is contained within the housing structure; and an elastomeric layer which is molded over a portion of said housing structure which surrounds the display aperture and extends into a portion of the display aperture so as to form an elastomeric flange, wherein the elastomeric flange is positioned in contact with the portion of said display frame which is exposed through the display aperture.

6. The apparatus of claim 5, wherein said housing structure comprises a first housing structure member which defines the display aperture therein and has an exterior side, and further wherein all of the exterior side of the first housing structure member is covered by said elastomeric layer.

7. The apparatus of claim 5, wherein:
the elastomeric flange includes a first locking portion; and
the display frame includes a second locking portion, wherein the first locking portion cooperates with the second locking portion so as to lock the elastomeric layer to the display frame.

8. The apparatus of claim 7, wherein:
the first locking portion includes a first set of elongated grooves and tongues; and
the second locking portion includes a second set of elongated grooves and tongues which are formed complementary to the first set of elongated grooves and tongues so as to mesh in a friction fit manner therewith.

9. The combination of an apparatus and an electronic device which includes a display having a first lock member, the apparatus comprising:
a housing structure having a display aperture defined therein, wherein the display is exposed through the display aperture when the electronic device is housed in the apparatus; and
an elastomeric layer being molded over and secured to said housing structure and having a second lock member, wherein the first lock member cooperates with the second lock member so as to seal the housing.

10. The apparatus of claim 9, wherein said housing structure comprises a first housing structure member which defines the display aperture therein and has an exterior side, and further wherein all of the exterior side of the first housing structure member is covered by said elastomeric layer.

11. The apparatus of claim 9, wherein:
the first lock member includes a first set of elongated grooves and tongues; and
the second lock member includes a second set of elongated grooves and tongues which are formed complementary to the first set of elongated grooves and tongues so as to mesh in a friction fit manner therewith.

* * * * *